United States Patent
You et al.

(10) Patent No.: US 9,728,816 B2
(45) Date of Patent: Aug. 8, 2017

(54) LITHIUM-RICH ELECTRODE SHEET OF LITHIUM-ION BATTERY AND PREPARATION METHOD THEREOF

(71) Applicant: Dongguan Amperex Technology Limited, Dongguan (CN)

(72) Inventors: Conghui You, Dongguan (CN); Yanjie Xu, Dongguan (CN); Fubiao Cao, Dongguan (CN); Hongxin Fang, Dongguan (CN); Baiqing Zhang, Dongguan (CN)

(73) Assignee: DONGGUAN AMPEREX TECHNOLOGY LIMITED, Dongguan (CN)

( * ) Notice: Subject to any disclaimer, the term of this patent is extended or adjusted under 35 U.S.C. 154(b) by 176 days.

(21) Appl. No.: 14/242,776

(22) Filed: Apr. 1, 2014

(65) Prior Publication Data
US 2014/0295265 A1 Oct. 2, 2014

(30) Foreign Application Priority Data

Apr. 2, 2013 (CN) .......................... 2013 1 0113698

(51) Int. Cl.
*H01M 4/02* (2006.01)
*H01M 10/42* (2006.01)

(52) U.S. Cl.
CPC .............................. *H01M 10/4235* (2013.01)

(58) Field of Classification Search
CPC ...... H01M 4/13; H01M 4/366; H01M 4/0404; H01M 4/139; H01M 10/4235; Y02P 70/54
See application file for complete search history.

(56) References Cited

U.S. PATENT DOCUMENTS

| 2007/0281207 A1* | 12/2007 | Takeuchi | H01M 6/16 429/112 |
| 2010/0099031 A1* | 4/2010 | Kato | H01M 10/052 429/330 |
| 2011/0165462 A1* | 7/2011 | Zhamu | H01M 4/134 429/223 |

FOREIGN PATENT DOCUMENTS

| CN | 1177417 A | 3/1998 |
| CN | 1830110 A | 9/2006 |

* cited by examiner

*Primary Examiner* — Raymond Alejandro
(74) *Attorney, Agent, or Firm* — Morgan, Lewis & Bockius LLP

(57) ABSTRACT

The invention relates to a lithium-rich electrode plate of a lithium-ion battery and a preparation method thereof. The electrode plate includes a collector; a film containing an active material and forming on the collector, and forming an elementary electrode plate together with the collector; and a porous lithium sheet covering on the film, so that a resulting capacity of the porous lithium sheet matches a planned lithium-supplemental capacity to an anode of a lithium-ion battery. The electrode plate can accurately control lithium supplemental quantity to the anode, improve lithium-supplemental uniformity, improve the first coulombic efficiency, energy density, and electrochemical performance of the battery, and decrease deformation of the cell. Furthermore, the method can be performed simply and the cost thereof is low.

9 Claims, No Drawings

LITHIUM-RICH ELECTRODE SHEET OF LITHIUM-ION BATTERY AND PREPARATION METHOD THEREOF

REFERENCE TO RELATED APPLICATIONS

The Present Application claims priority to Chinese Patent Application No. CN 201310113698.3 filed on Apr. 2, 2013, the content of which is fully incorporated in its entirety herein.

FIELD OF THE PRESENT DISCLOSURE

The present disclosure relates to a lithium-ion battery, and more specifically to a lithium-rich electrode plate of a lithium-ion battery and a preparation method thereof.

BACKGROUND OF THE PRESENT DISCLOSURE

In 1991, Sony Corporation in Japan creatively used carbon material as an anode active material of a lithium-ion battery, which brought a revolutionary change to the lithium-ion battery field. Because the lithium-ion battery has many advantages, such as high voltage, small volume, light weight, high specific energy, non-memory effect, non-pollution, small self-discharge and long cycle life and the like, it has been unprecedentedly developed in application of the field of mobile devices, including mobile phones, cameras, notebook computers and other portable electrical appliances. Since twenty-first century, awareness of environmental protection of the human being has been further improved, so that the lithium-ion battery has more potential to be used, and is generally considered as a desirable power supply of mobile appliances, power supply of electric vehicles and storage device of storage power stations in the new century.

But with a trend of miniaturization and longstanding of portable electronic devices, high energy density of the lithium-ion battery for these devices is required greatly, therefore an active material with high specific capacity is applied to the lithium-ion battery field, wherein alloy material is more outstanding one. For the anode active materials, a Solid Electrolyte Interface membrane (SEI membrane) would be formed during the first charging, which consumes a part of lithium ions deintercalated from the cathode active material, eventually resulting in the first coulombic efficiency of the cell less than 100%. For example, the first coulombic efficiency of graphite material is about 90%, while the alloy anode material is much lower, such as silicon anode active material, the first coulombic efficiency of which ranges from 65% to 85%. In order to improve energy density of the cell, the first coulombic efficiency of the cell is required to increase.

In order to obtain a lithium-rich electrode plate improving the first coulombic efficiency of the cell, domestic and oversea experts have carried out extensive researches, and achieved some achievements. Chinese patent application publication No. CN1830110A discloses a lithium-rich electrode plate with details as follows: lithium metal, an anode material and a non-aqueous liquid are mixed to form a slurry, the slurry is coated on a collector, and then the slurry is baked to obtain a lithium-rich electrode plate of a lithium-ion battery, wherein lithium metal particles are mixed into the coating layer. Due to lithium metal present in the coating layer of the electrode plate, the density of the active material in the electrode plate is lowered, connection among active material particles is weakened and electronic resistance is increased; at the same time, although this method can work in lithium-supplement and finally achieve the object of improving the first coulombic efficiency of the cell, the whole production process of the cell must be operated in a drying chamber and meanwhile the lithium metal and the anode material are difficult to be mixed together, thus the production cost is relative high. Chinese patent application publication No. CN1177417A discloses a lithium-rich lithium ion battery with details as follows: a lithium sheet is covered on a surface of an anode electrode plate, and then wound to form a battery; and then an electrolyte is injected, to produce a lithium-rich lithium-ion battery. When applying this method for lithium-supplement, since relative thin lithium metal sheet can not be produced by the existing technology, the quantity of lithium which can be absorbed by the anode electrode plate is much less than that provided by the lithium metal sheet, which results in problems, such as over lithium-supplement, deposition of lithium in the cell, poor cycle performance, and the like.

Therefore, it is necessary to provide a lithium-rich electrode plate of a lithium-ion battery and a preparation method thereof which can effectively control lithium-supplemental quantity to an anode and improve lithium-supplemental uniformity.

SUMMARY OF THE PRESENT DISCLOSURE

In view of the problems existing in the background technology, an object of the present disclosure is to provide a lithium-rich electrode plate of a lithium-ion battery and a preparation method thereof, which can accurately control lithium-supplemental quantity to an anode.

Another object of the present disclosure is to provide a lithium-rich electrode plate of a lithium-ion battery and a preparation method thereof, which can improve lithium-supplemental uniformity to an anode to produce a lithium-ion battery having good electrochemical performances.

In order to achieve the above objects, in a first aspect of the present disclosure, the present disclosure provides a lithium-rich electrode plate of a lithium-ion battery, comprising: a collector; a film containing an active material and forming on the collector, and forming an elementary electrode plate together with the collector; and a porous lithium sheet covering on the film, wherein a resulting capacity of the porous lithium sheet matches a planned lithium-supplemental capacity to an anode.

In a second aspect of the present disclosure, the present disclosure provides a preparation method of a lithium-rich electrode plate of a lithium-ion battery, for preparing the lithium-rich electrode plate of the lithium-ion battery according to the first aspect of the present disclosure, which comprises steps of: preparing a slurry from an active material, a conductive agent, an adhesive and a solvent, then coating the slurry on a collector, and performing baking to obtain an elementary electrode plate, wherein the slurry coated on the collector becomes a film after baking; making holes on a lithium metal sheet to obtain a porous lithium sheet, wherein a resulting capacity of the porous lithium sheet matches a planned lithium-supplemental capacity to an anode; and covering the porous lithium sheet on a surface of the film of the elementary electrode plate to obtain the lithium-rich electrode plate of the lithium-ion battery.

The present disclosure has following beneficial effects:

The lithium-rich electrode plate of the lithium-ion battery provided by the present disclosure not only overcomes a problem that the conventional lithium-rich electrode plate (wherein a whole lithium sheet without holes is used) yields redundant lithium supplemental capacity to the anode, but also can accurately control lithium-supplemental quantity to the anode, meanwhile can improve lithium-supplemental uniformity and effectively improve the first coulombic efficiency of the lithium-ion battery using the lithium-rich electrode plate, thereby improving energy density of the lithium-ion battery greatly, and ensuring a better electrochemical performance of the lithium-ion battery. The porous lithium sheet provided can increase the gap between an anode layer and a cathode layer of the cell of the lithium-ion battery, improve an entry velocity of the electrolyte, and decrease deformation of the cell. The preparation method of the lithium-rich electrode plate of the lithium-ion battery of the present disclosure can be performed simply and the cost thereof is low.

DETAILED DESCRIPTION

Hereinafter a lithium-rich electrode plate of a lithium-ion battery and a preparation method thereof and embodiments according to the present disclosure are described in details.

Firstly a lithium-rich electrode plate of a lithium-ion battery according to a first aspect of the present disclosure is described.

A lithium-rich electrode plate of a lithium-ion battery according to a first aspect of the present disclosure comprises: a collector; a film containing an active material and forming on the collector, and forming an elementary electrode plate together with the collector; and a porous lithium sheet covering on the film, wherein a resulting capacity of the porous lithium sheet matches a planned of lithium-supplemental capacity to an anode.

In the lithium-rich electrode plate of the lithium-ion battery according to the present disclosure, the lithium-supplemental quantity to the anode can be accurately controlled through the porous lithium sheet. Meanwhile it should be noted that, the resulting capacity of the porous lithium sheet matching the planned lithium-supplemental capacity to the anode means that the resulting capacity of the porous lithium sheet may be equal to or not equal to the planned lithium-supplemental capacity to the anode. When the resulting capacity of the porous lithium sheet is equal to the planned lithium-supplemental capacity to the anode, it is referred to as a full lithium-supplement. When the resulting capacity of the porous lithium sheet is greater than the planned lithium-supplemental capacity to the anode, it is referred to as an overmuch lithium-supplement. When the resulting capacity of the porous lithium sheet is less than the planned lithium-supplemental capacity to the anode, it is referred to as an insufficient lithium-supplement. In addition, the porous lithium sheet can achieve uniform lithium-supplement to the anode. Furthermore, when a cell is prepared by using the lithium-rich electrode plate, the porous lithium sheet provided increases a gap between an anode layer and a cathode layer of the cell of the lithium-ion battery, the holes in the porous lithium sheet improve an entry velocity of the electrolyte. Both the gap and the holes in the porous lithium sheet can decrease deformation of the cell.

Preferably, in the lithium-rich electrode plate of the lithium-ion battery according to the first aspect of the present disclosure, a thickness of the porous lithium sheet is 1 μm~500 μm, preferably 10 μm~50 μm.

Preferably, in the lithium-rich electrode plate of the lithium-ion battery according to the first aspect of the present disclosure, a width of the porous lithium sheet is a, a width of the elementary electrode plate is b, wherein b−40 μm≤a≤b, preferably b−20 μm≤a≤b.

In the lithium-rich electrode plate of the lithium-ion battery according to the first aspect of the present disclosure, a shape of a hole of the porous lithium sheet is at least one of circle, square, rhombus, oval, triangle or polygon.

In the lithium-rich electrode plate of the lithium-ion battery according to the first aspect of the present disclosure, an equivalent aperture of the hole of the porous lithium sheet is 0.10 μm~20.99 μm, preferably 1.13 μm~11.28 μm. Herein, the equivalent aperture is calculated as follows: one hole in the porous lithium sheet is presented, an area of the hole is calculated, a diameter as a homalographic circle is then calculated and the calculated diameter is the equivalent aperture.

In the lithium-rich electrode plate of the lithium-ion battery according to the first aspect of the present disclosure, preferably, the holes of the porous lithium sheet are identical and are arranged with equal-interval.

In the lithium-rich electrode plate of the lithium-ion battery according to the first aspect of the present disclosure, the porous lithium sheet has a net structure.

In the lithium-rich electrode plate of the lithium-ion battery according to the first aspect of the present disclosure, the elementary electrode plate may be an elementary anode electrode plate; the active material contained in the film of the elementary electrode plate is an anode active material which is at least one of graphite, silicon or silicon-carbon alloy.

In the lithium-rich electrode plate of the lithium-ion battery according to the first aspect of the present disclosure, the elementary electrode plate is an elementary cathode electrode plate; the active material contained in the film of the elementary electrode plate is a cathode active material which is at least one of lithium cobalt oxide, lithium manganese oxide, lithium iron phosphate or lithium tri-element transition metal oxides.

Next a preparation method of a lithium-rich electrode plate of a lithium-ion battery according to a second aspect of the present disclosure is described.

A preparation method of a lithium-rich electrode plate of a lithium-ion battery according to the present disclosure, for preparing the lithium-rich electrode plate of the lithium-ion battery according to the first aspect of the present disclosure, comprises steps of: preparing a slurry from an active material, a conductive agent, an adhesive and a solvent, then coating the slurry on a collector, and performing baking to obtain an elementary electrode plate, wherein the slurry coated on the collector becomes a film after baking; making holes on a lithium metal sheet to obtain a porous lithium sheet, wherein a resulting capacity of the porous lithium sheet matches a planned lithium-supplemental capacity to an anode; and covering the porous lithium sheet on a surface of the film of the elementary electrode plate to obtain the lithium-rich electrode plate of the lithium-ion battery.

Then examples and comparative examples of the lithium-rich electrode plate of the lithium-ion battery according to the present disclosure are described.

Example 1

A: Preparation of an Elementary Electrode Plate

An active material graphite (wherein a specific capacity of the graphite was 340 mAh/g, the first coulombic efficiency was 91%), an adhesive, a conductive agent, according to a weight ratio of 92:3:5, were mixed with a solvent to form a slurry (wherein the adhesive was PVDF, the conductive agent was conductive carbon black, the solvent was N-methyl-pyrrolidone (NMP)), the slurry was coated on both sides of a copper foil collector with a coating amount of 100 mg/1540 mm² at each side, then baking was performed, a film was formed, wherein a water content thereof was less than 300 ppm, then after cold pressing, cutting and welding a corresponding tab, an elementary electrode plate with a width of 160 mm was obtained. The elementary electrode plate was an elementary anode electrode plate.

B: Preparation of a Porous Lithium Sheet (for the Film on the Each Side of the Anode Collector)

1) Rich Amount of Lithium of the Lithium-Rich Electrode Plate the elementary anode electrode plate in the present example was lithium-supplemented (that is, the anode was lithium-supplemented);

the lithium-rich-amount of the lithium-rich electrode plate was 3% of the capacity of the elementary electrode plate;

a planned lithium-rich-capacity per unit area of the elementary electrode plate was:

$$100 \text{ mg}/1540 \text{ mm}^2 \times 92\% \times 340 \text{ mAh/g} \times 3\% = 6.09 \times 10^{-4} \text{ mAh/mm}^2.$$

2) Providing a Lithium Metal Sheet the lithium metal sheet had a thickness of 1 μm, a width of 120 mm, a specific capacity of 3700 mAh/g, and a density of 0.534 g/cm³;

the capacity per unit area of the lithium metal sheet was:

$$1 \text{ μm} \times 3700 \text{ mAh/g} \times 0.534 \text{ g/cm}^3 = 1.976 \times 10^{-3} \text{ mAh/mm}^2$$

3) Preparation of a Porous Lithium Sheet holes were made uniformly in the lithium metal sheet so that a porous lithium sheet was formed, wherein a percentage of the area of un-punched area (that is, a remaining area in the lithium metal sheet after making holes) to a total area of the lithium metal sheet (that is, an area of the lithium metal sheet before making holes) was:

$$[(6.09 \times 10^{-4} \text{ mAh/mm}^2) \times 160 \text{ mm}]/[(1.976 \times 10^{-3} \text{ mAh/mm}^2) \times 120 \text{ mm}] \times 100\% = 41.09\%;$$

wherein, a shape of the holes was circle while making holes, a diameter of the holes was 0.1 μm (that is, an equivalent aperture was 0.1 μm).

C: Preparation of a Lithium-Rich Electrode Plate the porous lithium sheet prepared was covered on a surface of the film of the elementary electrode plate to obtain the lithium-rich electrode plate of the lithium-ion battery.

Example 2

It was the same as example 1 except the following:

A: Preparation of an Elementary Electrode Plate a mixture of graphite and silicon (wherein a specific capacity of the mixture was 400 mAh/g, the first coulombic efficiency was 82%) was the active material;

the coating amount of the slurry was 80 mg/1540 mm²;

a width of the elementary electrode plate prepared was 100 mm.

B: preparation of a Porous Lithium Sheet (for the Film on the Each Side of the Anode Collector)

1) Rich Amount of Lithium of the Lithium-Rich Electrode Plate the lithium-rich-amount of the lithium-rich electrode plate was 12% of the capacity of the elementary electrode plate;

a planned lithium-rich-capacity per unit area of the elementary electrode plate was:

$$80 \text{ mg}/1540 \text{ mm}^2 \times 92\% \times 400 \text{ mAh/g} \times 12\% = 2.29 \times 10^{-3} \text{ mAh/mm}^2.$$

2) Providing a Lithium Metal Sheet the lithium metal sheet provided had a thickness of 10 μm and a width of 100 mm;

a capacity per unit area of the lithium metal sheet was:

$$10 \text{ μm} \times 3700 \text{ mAh/g} \times 0.534 \text{ g/cm}^3 = 1.9758 \times 10^{-2} \text{ mAh/mm}^2$$

3) Preparation of a Porous Lithium Sheet a percentage of the area of un-punched area to a total area of the lithium metal sheet was:

$$[(2.29 \times 10^{-3} \text{ mAh/mm}^2) \times 100 \text{ mm}]/[(1.9758 \times 10^{-2} \text{ mAh/mm}^2) \times 100 \text{ mm}] \times 100\% = 11.59\%$$

wherein a shape of the holes was square while making holes, a side-length of the square was 1 μm and an equivalent aperture was 1.13 μm based on calculation as a homalographic circle.

Example 3

It was the same as example 1 except the following:

A: Preparation of an Elementary Electrode Plate a mixture of graphite and silicon (wherein a specific capacity of the mixture was 600 mAh/g, the first coulombic efficiency was 72%) was the active material;

a coating amount of the slurry was 110 mg/1540 mm²;

a width of the elementary electrode plate prepared was 100 mm.

B: Preparation of a Porous Lithium Sheet (for the Film on the Each Side of the Anode Collector)

1) Rich Amount of Lithium of a Lithium-Rich Electrode Plate the lithium-rich-amount of the lithium-rich electrode plate was 22% of the capacity of the elementary electrode plate;

a planned lithium-rich-capacity per unit area of the elementary electrode plate was:

$$110 \text{ mg}/1540 \text{ mm}^2 \times 92\% \times 600 \text{ mAh/g} \times 22\% = 8.674 \times 10^{-3} \text{ mAh/mm}^2$$

2) Providing a Lithium Metal Sheet the lithium metal sheet provided had a thickness of 25 μm and a width of 100 mm;

a capacity per unit area of the lithium metal sheet was:

$$25 \text{ μm} \times 3700 \text{ mAh/g} \times 0.534 \text{ g/cm}^3 = 4.9395 \times 10^{-2} \text{ mAh/mm}^2$$

3) Preparation of a Porous Lithium Sheet a percentage of the area of un-punched area to a total area of the lithium metal sheet was:

$$[(8.674 \times 10^{-3} \text{ mAh/mm}^2) \times 100 \text{ mm}]/[(4.9395 \times 10^{-2} \text{ mAh/mm}^2) \times 100 \text{ mm}] \times 100\% = 17.56\%$$

wherein a shape of the holes was square while making holes, a side-length of the square was 5 μm and the equivalent aperture was 5.64 μm based on calculation as a homalographic circle.

Example 4

It was the same as example 3 except the following:

the shape of the holes was square while making holes, a side-length of the square was 10 μm and the equivalent aperture was 11.28 μm based on calculation as a homalographic circle.

Example 5

It was the same as example 3 except the following:
a shape of the holes was regular hexagon while making holes, a side-length of the regular hexagon was 5 μm and the equivalent aperture was 9.08 μm based on calculation as a homalographic circle.

Example 6

It was the same as example 1 except the following:
A: Preparation of an Elementary Electrode Plate
silicon (wherein a specific capacity thereof was 1300 mAh/g, the first coulombic efficiency was 62%) was the active material;
a coating amount of the slurry was 90 mg/1540 mm$^2$;
a width of the elementary electrode plate prepared was 100 mm;
B: Preparation of a Porous Lithium Sheet (for the Film on the Each Side of the Anode Collector)
1) Rich Amount of Lithium of the Lithium-Rich Electrode Plate
the lithium-rich-amount of the lithium-rich electrode plate was 32% of the capacity of the elementary electrode plate;
a planned lithium-rich-capacity per unit area of the elementary electrode plate was:

$$90 \text{ mg}/1540 \text{ mm}^2 \times 92\% \times 1300 \text{ mAh/g} \times 32\% = 2.237 \times 10^{-2} \text{ mAh/mm}^2$$

2) Providing a Lithium Metal Sheet
the lithium metal sheet provided had a thickness of 50 μm and a width of 100 mm;
a capacity per unit area of the lithium metal sheet was:

$$50 \text{ μm} \times 3700 \text{ mAh/g} \times 0.534 \text{ g/cm}^3 = 9.879 \times 10^{-2} \text{ mAh/mm}^2$$

3) Preparation of a Porous Lithium Sheet
a percentage of the area of un-punched area to a total area of the lithium metal sheet was:

$$[(2.237 \times 10^{-2} \text{ mAh/mm}^2) \times 100 \text{ mm}]/[(9.879 \times 10^{-2} \text{ mAh/mm}^2) \times 100 \text{ mm}] \times 100\% = 22.6\%$$

a shape of the holes was rhombus while making holes, one interior angle of the rhombus was 60°,
a short diagonal length of the rhombus was 20 μm, and the equivalent aperture was 20.99 μm based on calculation as a homalographic circle.

Example 7

It was the same as example 6 except the following:
a thickness of the lithium metal sheet was varied to 500 μm, and a corresponding variation, which was shown below, occurred based on the variation of the thickness of the lithium metal sheet:
the capacity per unit area of the lithium metal sheet was:

$$500 \text{ μm} \times 3700 \text{ mAh/g} \times 0.534 \text{ g/cm}^3 = 0.9879 \text{ mAh/mm}^2$$

the percentage of the area of un-punched area to a total area of the lithium metal sheet was:

$$[(2.237 \times 10^{-2} \text{ mAh/mm}^2) \times 100 \text{ mm}]/[(0.9879 \text{ mAh/mm}^2) \times 100 \text{ mm}] \times 100\% = 2.26\%$$

Example 8

A: Preparation of an Elementary Electrode Plate
an active material lithium cobalt oxide (wherein a specific capacity thereof was 142 mAh/g, the first coulombic efficiency was 96%), an adhesive, a conductive agent, according to a weight ratio of 93:2:5, were mixed uniformly with a solvent to form a slurry (wherein, the adhesive was PVDF, the conductive agent was conductive carbon black, the solvent was N-methyl-pyrrolidone (NMP)), the slurry was coated on both sides of an aluminum foil collector with a coating amount of 576 mg/1540 mm$^2$ at each side, then baking was performed, and a film was formed, wherein the water content of the film was less than 300 ppm, then after cold pressing, cutting and welding a corresponding tab, an elementary electrode plate with a width of 98 mm was obtained, the elementary electrode plate was an elementary cathode electrode plate.
B: Preparation of a Porous Lithium Sheet (for the Film on the Each Side of the Anode Collector)
1) Rich Amount of Lithium of a Lithium-Rich Electrode Plate
the elementary anode electrode plate in the step A of the example 3 was lithium-supplemented (that is, the anode was lithium-supplemented);
the lithium-rich-amount of the lithium-rich electrode plate was 22% of the capacity of the elementary anode electrode plate in the example 3;
a planned lithium-rich-capacity per unit area of the elementary anode electrode plate was:

$$110 \text{ mg}/1540 \text{ mm}^2 \times 92\% \times 600 \text{ mAh/g} \times 22\% = 8.674 \times 10^{-3} \text{ mAh/mm}^2$$

2) Providing a Lithium Metal Sheet
the lithium metal sheet provided had a thickness of 25 μm, a width of 98 mm, a specific capacity of 3700 mAh/g, and a density of 0.534 g/cm$^3$;
a capacity per unit area of the lithium metal sheet was:

$$25 \text{ μm} \times 3700 \text{ mAh/g} \times 0.534 \text{ g/cm}^3 = 4.9395 \times 10^{-2} \text{ mAh/mm}^2$$

3) Preparation of a Porous Lithium Sheet
holes were made uniformly in the lithium metal sheet so that a porous lithium sheet was formed, wherein a percentage of the area of un-punched area (that is, a remaining area in the lithium metal sheet after making holes) to a total area of the lithium metal sheet (that is, an area of the lithium metal sheet before making holes) was:

$$[(8.674 \times 10^{-3} \text{ mAh/mm}^2) \times 98 \text{ mm}]/[(4.9395 \times 10^{-2} \text{ mAh/mm}^2) \times 100 \text{ mm}] \times 100\% = 17.21\%.$$

wherein, a shape of the holes was square while making holes, a side-length of the square was 5 μm and the equivalent aperture was 5.64 μm based on calculation as a homalographic circle.
C: Preparation of a Lithium-Rich Electrode Plate
the porous lithium sheet prepared was covered on a surface of the film of the elementary electrode plate to obtain the lithium-rich electrode plate of the lithium-ion battery.

Comparative Example 1

Only performing the step of preparation of an elementary electrode plate (that is, step A) in example 1. The elementary electrode plate prepared may be referred to as a non-lithium-rich electrode plate.

Comparative Example 2

Only performing the step of preparation of an elementary electrode plate (that is, step A) in example 2. The elementary electrode plate prepared may be referred to as a non-lithium-rich electrode plate.

Comparative Example 3

Only performing the step of preparation of an elementary electrode plate (that is, step A) in example 3. The elementary electrode plate prepared can be referred to as a non-lithium-rich electrode plate.

Comparative Example 4

It was the same as example 3 only except the followings: a shape of the holes was square while making holes, a side-length of the square was 30 μm and an equivalent aperture was 33.84 μm based on calculation as a homalographic circle.

Comparative Example 5

Only performing the step of preparation of an elementary electrode plate (that is, step A) in example 6. The elementary electrode plate prepared can be referred to as a non-lithium-rich electrode plate.

Hereinafter lithium-ion batteries prepared based on examples 1-8 and comparative examples 1-5, and testing results concerning performances thereof, are presented.

Preparation of cathode electrode plates (corresponding to examples 1-7 and comparative examples 1-5): the elementary electrode plate (that is, the elementary cathode electrode plate) prepared in the step A of example 8 was used as the cathode electrode plate of the examples 1-7 and the comparative examples 1-5.

Preparation of an anode electrode plate (corresponding to example 8): the elementary electrode plate (that is, the elementary anode electrode plate) prepared in the step A of example 3 was used as the anode electrode plate of example 8.

Preparation of lithium-ion batteries: the lithium-rich electrode plates in examples 1-8 and comparative example 4, the non-lithium-rich electrode plates in comparative examples 1-3 and comparative example 5 were wound with dried separators and counter electrode plates to prepare bare cells, after casing the bare cells, injecting electrolyte (wherein the concentration of lithium salt $LiPF_6$ was 1 mol/L, the proportion of other components ethylene carbonate (EC), diethyl carbonate (DEC), vinylene carbonate (VC) and 1,3-propane sultone (PS) was 40:60:1:3), standing by the bare cells in condition of 25° C. to achieve excellent electrolyte infiltration, formation (formation capacity was ICC0), clamp-baking and degassing, finally lithium-ion batteries with lithium-rich cells were obtained.

Capacity testing: After standing by 3 min in a condition of 35° C., the lithium-ion batteries of examples 1-8 and comparative examples 1-5 were charged and discharged as follows: charged to 4.2V at a constant current of 0.5 C, then charged to 0.05 C at the constant voltage of 4.2V, to obtain a charging capacity of AgC0; standing by 3 min; then discharged to 3.0V at a constant current of 0.5 C, to obtain a first discharging capacity of D0; standing by 3 min, finally capacity testing was finished.

A formula for calculating a first coulombic efficiency of cells was D0/(ICC0+AGC0), wherein ICC0+AGC0 was the first charging capacity, the results can be seen in table 1.

(1) Analysis on the Anode Electrode Plates

It can be seen from table 1, both the first discharging capacity D0 and the first coulombic efficiency of the lithium-ion batteries prepared in examples 1-7 were better than those of the lithium-ion batteries prepared in comparative examples 1-5, therefore it was shown that the first coulombic efficiency of the lithium-rich cells prepared by using the lithium-rich electrode plates of the lithium-ion batteries of the present disclosure had an obvious improvement.

The side-length of the square holes in comparative example 4 was 30 μm (the equivalent aperture was 33.84 μm, which was bigger than the equivalent aperture of 20.99 μm), both D0 and the first coulombic efficiency of the lithium-ion battery prepared were obviously worse than those in example 3 and example 4, therefore it was shown that the equivalent aperture of the porous lithium sheet cannot be too big.

The cells of the lithium-ion batteries of examples 1-7 and comparative examples 1-5 were disassembled just after being fully charged at 3.0V, it can be observed that interfacial uniformity of the anode film sheets in examples 1-6 was good, interfacial uniformity of the anode film sheet in example 7 was comparatively worse (After fully charging the battery, there was slight extraction of lithium at the position of lithium-supplement, and the first coulombic efficiency of the battery in example 7 was less than those of the batteries in examples 1-6). It was shown that, if the porous lithium sheet was excessively thick, the percentage of the area of un-punched area to the total area of the lithium metal sheet will be much lower due to the limitation of lithium-supplemental amount, therefore effect of lithium-supplement will be affected because of over-concentration of lithium; interfacial uniformity of the anode film sheet of the cell in comparative example 4 was the worst (after fully charging the battery, there was obvious extraction of lithium at the position of lithium-supplement), it was shown that if the equivalent aperture of the holes made was too big (more than the equivalent aperture of 20.99 μm), the effect of lithium-supplement will be affected because the lithium supplemented cannot achieve uniform diffusion in a short time.

(2) Analysis on the Cathode Electrode Plates

Example 8 and example 3 were compared. The first charging capacity of the cell of the lithium-ion battery in example 8 was obviously higher than that in example 3; the reason was that both the lithium supplemented and the lithium capable of being deintercalated from the cathode itself shall be transferred to the anode during the first charging, when lithium-supplement was performed on the cathode. That is, the first charging capacity comes from the sum of lithium supplemented and lithium provided by the cathode, therefore the first charging capacity was higher than that of the cell without lithium-supplement; meanwhile the first discharging capacity D0 in example 8 was similar to that in example 3, it was shown that the lithium-rich electrode plate of the lithium-ion battery of the present disclosure can improve the discharging capacity of the battery.

In conclusion, the lithium-rich electrode plate of the lithium-ion battery of the present disclosure can avoid excessive lithium-supplement and can achieve uniform lithium-supplement, and can improve the performances of the battery by using the lithium-rich electrode plates, furthermore the preparation process is simple, the cost thereof is low, and it is easy to realize industrial production.

TABLE 1

Preparation and testing results of the lithium-ion batteries of Examples 1-8 and Comparative examples 1-5

| | elementary electrode plate | | | | porous lithium sheet | | |
|---|---|---|---|---|---|---|---|
| | type | active material | width mm | lithium rich amount | thickness μm | width mm | shape of holes |
| Example 1 | anode | efficiency 91% graphite | 160 | 3% | 1 | 120 | circle |
| Example 2 | anode | efficiency 82%(graphite + silicon) | 100 | 12% | 10 | 100 | square |
| Example 3 | anode | efficiency 72%(graphite + silicon) | 100 | 22% | 25 | 100 | square |
| Example 4 | anode | efficiency 72%(graphite + silicon) | 100 | 22% | 25 | 100 | square |
| Example 5 | anode | efficiency 72%(graphite + silicon) | 100 | 22% | 25 | 100 | regular hexagon |
| Example 6 | anode | efficiency 62% silicon | 100 | 32% | 50 | 100 | rhombus |
| Example 7 | anode | efficiency 62% silicon | 100 | 32% | 500 | 100 | rhombus |
| Example 8 | cathode | 96% lithium cobalt oxide | 98 | 22% | 25 | 98 | square |
| Comparative example1 | anode | efficiency 91% graphite | 160 | / | / | / | / |
| Comparative example2 | anode | efficiency 82%(graphite + silicon) | 100 | / | / | / | / |
| Comparative example3 | anode | efficiency 72%(graphite + silicon) | 100 | / | / | / | / |
| Comparative example4 | anode | efficiency 72%(graphite + silicon) | 100 | 22% | 25 | 100 | square |
| Comparative example5 | anode | efficiency 62% silicon | 100 | / | / | / | / |

| | porous lithium sheet | | | | |
|---|---|---|---|---|---|
| | equivalent aperture (μm) | percentage of an area un-punched | ICC0 + AGC0 (mAh) | D0 (mAh) | first coulombic efficiency of battery |
| Example 1 | 0.1 | 41.09% | 1550 | 1457 | 94% |
| Example 2 | 1.13 | 11.59% | 1570 | 1476 | 94% |
| Example 3 | 5.64 | 17.56% | 1562 | 1468 | 94% |
| Example 4 | 11.28 | 17.56% | 1560 | 1466 | 94% |
| Example 5 | 9.08 | 17.56% | 1561 | 1467 | 94% |
| Example 6 | 20.99 | 22.60% | 1560 | 1466 | 94% |
| Example 7 | 20.99 | 2.26% | 1558 | 1433 | 92% |
| Example 8 | 5.64 | 17.21% | 1915 | 1460 | 76% |
| Comparative example1 | / | / | 1549 | 1410 | 91% |
| Comparative example2 | / | / | 1571 | 1288 | 82% |
| Comparative example3 | / | / | 1560 | 1123 | 72% |
| Comparative example4 | 33.84 | 17.56% | 1560 | 1264 | 81% |
| Comparative example5 | / | / | 1555 | 964 | 62% |

What is claimed is:

1. An electrode plate of a lithium-ion battery, comprising:
   a collector;
   a film containing an active material formed on the collector, and the film and the collector forming an elementary electrode plate; and
   a lithium metal sheet having uniformly-distributed through holes and covering the film of the elementary electrode plate, wherein:
   each through hole has a predefined dimension such that the lithium metal sheet has a remaining area corresponding to a resulting capacity equal to or less than a predefined lithium-supplemental capacity of an anode of a lithium-ion battery made from the electrode plate;
   the lithium metal sheet increases a gap between the anode and a cathode of the lithium-ion battery; and
   the uniformly-distributed through holes in the lithium metal sheet improve an entry velocity of electrolyte flowing through the lithium metal sheet when the electrolyte is injected into the lithium-ion battery.

2. The electrode plate of the lithium-ion battery according to claim 1, wherein a thickness of the lithium metal sheet is 1 μm~500 μm.

3. The electrode plate of the lithium-ion battery according to claim 2, wherein a thickness of the lithium metal sheet is 10 μm~50 μm.

4. The electrode plate of the lithium-ion battery according to claim 1, wherein a width of the lithium metal sheet is a, a width of the elementary electrode plate is b, wherein b−40 μm≤a≤b.

5. The electrode plate of the lithium-ion battery according to claim 4, wherein b−20 μm≤a≤b.

6. The electrode plate of the lithium-ion battery according to claim 1, wherein an equivalent aperture of each of the holes of the lithium metal sheet is 0.10 μm~20.99 μm, and the equivalent aperture is calculated as follows: one hole in the lithium metal sheet is presented, an area of the hole is calculated, a diameter as a homalographic circle is then calculated and the calculated diameter is the equivalent aperture.

7. The electrode plate of the lithium-ion battery according to claim 6, wherein the equivalent aperture of each of the holes of the lithium metal sheet is 1.13 μm~11.28 μm.

8. The electrode plate of the lithium-ion battery according to claim 1, wherein the holes of the lithium metal sheet are identical and are arranged with equal-interval.

9. The electrode plate of the lithium-ion battery according to claim 1, wherein
the elementary electrode plate is an elementary anode electrode plate;
the active material contained in the film of the elementary electrode plate is an anode active material which is at least one of graphite, silicon or silicon-carbon alloy.

* * * * *